United States Patent
Yuge et al.

(10) Patent No.: US 9,373,846 B2
(45) Date of Patent: Jun. 21, 2016

(54) NEGATIVE ELECTRODE ACTIVE MATERIAL AND METHOD FOR PRODUCING THE SAME

(71) Applicants: Ryota Yuge, Tokyo (JP); Noriyuki Tamura, Tokyo (JP)

(72) Inventors: Ryota Yuge, Tokyo (JP); Noriyuki Tamura, Tokyo (JP)

(73) Assignee: NEC Coporation, Tokyo (JP)

( * ) Notice: Subject to any disclaimer, the term of this patent is extended or adjusted under 35 U.S.C. 154(b) by 0 days.

(21) Appl. No.: 14/405,182

(22) PCT Filed: Dec. 20, 2012

(86) PCT No.: PCT/JP2012/083071
§ 371 (c)(1),
(2) Date: Dec. 3, 2014

(87) PCT Pub. No.: WO2013/183187
PCT Pub. Date: Dec. 12, 2013

(65) Prior Publication Data
US 2015/0132655 A1 May 14, 2015

(30) Foreign Application Priority Data
Jun. 6, 2012 (JP) ................................. 2012-128926

(51) Int. Cl.
| | |
|---|---|
| *H01M 4/133* | (2010.01) |
| *H01M 4/62* | (2006.01) |
| *H01M 4/36* | (2006.01) |
| *H01M 4/13* | (2010.01) |
| *H01M 4/139* | (2010.01) |
| *H01M 4/131* | (2010.01) |
| *H01M 4/134* | (2010.01) |

(Continued)

(52) U.S. Cl.
CPC ................ *H01M 4/625* (2013.01); *H01M 4/13* (2013.01); *H01M 4/139* (2013.01); *H01M 4/362* (2013.01); *H01M 4/0402* (2013.01); *H01M 4/131* (2013.01); *H01M 4/133* (2013.01); *H01M 4/134* (2013.01); *H01M 2004/027* (2013.01); *H01M 2220/20* (2013.01); *H01M 2220/30* (2013.01)

(58) Field of Classification Search
CPC ...... H01M 4/133; H01M 4/134; H01M 4/137
See application file for complete search history.

(56) References Cited

U.S. PATENT DOCUMENTS

| | | | |
|---|---|---|---|
| 2006/0172179 A1* | 8/2006 | Gu et al. | 429/44 |
| 2008/0145757 A1* | 6/2008 | Mah | H01M 4/133 429/219 |

(Continued)

FOREIGN PATENT DOCUMENTS

| | | | |
|---|---|---|---|
| JP | 2007-042620 A | 2/2007 | |
| JP | 2007-329001 A | 12/2007 | |

(Continued)

OTHER PUBLICATIONS

International Search Report corresponding to PCT/JP2012/083071, dated Apr. 2, 2013 (3 pages).

*Primary Examiner* — Stewart Fraser
*Assistant Examiner* — Olatunji Godo
(74) *Attorney, Agent, or Firm* — Wilmer Cutler Pickering Hale and Dorr LLP (57) ABSTRACT

It is an object of an exemplary embodiment of the present invention to provide a negative electrode active material having excellent rate characteristics and cycle characteristics. One embodiment according to the present invention is a negative electrode active material comprising a carbon-containing composite, wherein, in the carbon-containing composite, an active material capable of intercalating and deintercalating lithium, conductive nanofibers and conductive carbon particles are coated with a carbon material and are integrated.

12 Claims, 3 Drawing Sheets

(51) Int. Cl.
*H01M 4/04* (2006.01)
*H01M 4/02* (2006.01)

(56) References Cited

U.S. PATENT DOCUMENTS

2008/0220329 A1* 9/2008 Kojima et al. ................ 429/188
2010/0143798 A1* 6/2010 Zhamu et al. ................. 429/212
2011/0165465 A1* 7/2011 Kim et al. ................... 429/231.5

FOREIGN PATENT DOCUMENTS

| JP | 2010-123437 A | 6/2010 |
| JP | 2010-129169 A | 6/2010 |
| WO | WO-2012/063762 A1 | 5/2012 |

* cited by examiner

NEGATIVE ELECTRODE ACTIVE MATERIAL AND METHOD FOR PRODUCING THE SAME

CROSS-REFERENCE TO RELATED APPLICATIONS

This application is a national stage application of International Application No. PCT/JP2012/083071 entitled "Negative Electrode Active Material and Method for Producing the Same," filed on Dec. 20, 2012, which claims the benefit of the priority of Japanese Patent Application No. 2012-128926, filed on Jun. 6, 2012, the disclosures of each of which are hereby incorporated by reference in their entirety.

TECHNICAL FIELD

The present invention relates to negative electrode active material and a method for producing the same, preferably negative electrode active material for a lithium secondary battery and a method for producing the same.

BACKGROUND ART

In recent years, lithium ion batteries that feature light weight and high charge capacity have become widely used, as secondary batteries in cellular phones, notebook computers, electric cars and the like whose size and weight have been reduced and whose performance has been improved. In applications such as battery cars and electric tools, one problem is that high-current load properties is insufficient. As measures to address this problem, efforts have been made to reduce electrode impedance, more specifically, efforts have been focused on improving rate characteristics. In addition, volume change accompanying charge and discharge also leads to an increase in electrode impedance and the impedance between electrode materials and current collectors, and therefore, reducing the amount of volume change is one approach to achieve a reduction in impedance.

As a study of resistance reduction, Patent Literature 1 discloses a negative electrode for a lithium ion battery including a negative electrode active material, a conductive carbon material containing carbon fibers and a binder, wherein the carbon fibers are present in a state of not forming aggregates having a size of 10 μm or more. In Patent Literature 1, a mixture obtained by dry-mixing a negative electrode active material and carbon fibers, and polyvinylidene fluoride as a binder are stirred and mixed to obtain a negative electrode slurry.

Patent Literature 2 discloses a lithium ion battery including a negative electrode obtained by mixing carbon nanohorns with a graphite material.

Patent Literature 3 discloses a negative electrode material obtained by mixing carbon nanotubes and a thermoplastic resin and heating the mixture in an inert gas to coat the carbon nanotubes with carbon by pyrolysis.

CITATION LIST

Patent Literature

Patent Literature 1: JP2007-42620A
Patent Literature 2: JP2010-123437A
Patent Literature 3: JP2010-129169A

SUMMARY OF INVENTION

Technical Problem

However, in all of the above techniques, further improvement is required in terms of rate capability and cycle characteristics.

Accordingly, it is an object of an exemplary embodiment of the present invention to provide negative electrode active material having excellent rate characteristics and cycle characteristics.

Solution to Problem

One aspect of the present invention provides a negative electrode active material comprising a carbon-containing composite,
wherein, in the carbon-containing composite, an active material capable of intercalating and deintercalating lithium, conductive nanofibers and conductive carbon particles are coated with a carbon material and are integrated.

In addition, another aspect of the present invention provides a method for producing a negative electrode active material, comprising:
(1) mixing active material capable of intercalating and deintercalating lithium, conductive nanofibers and conductive carbon particles to obtain a carbon-containing mixture; and
(2) coating the carbon-containing mixture with a carbon material to integrate the active material, the conductive nanofibers and the conductive carbon particles.

Advantageous Effect of Invention

According to this exemplary embodiment, negative electrode active material having excellent rate characteristics and cycle characteristics can be provided.

DESCRIPTION OF EMBODIMENTS

Exemplary embodiments will be described below.

Exemplary Embodiment 1

Figure 1:
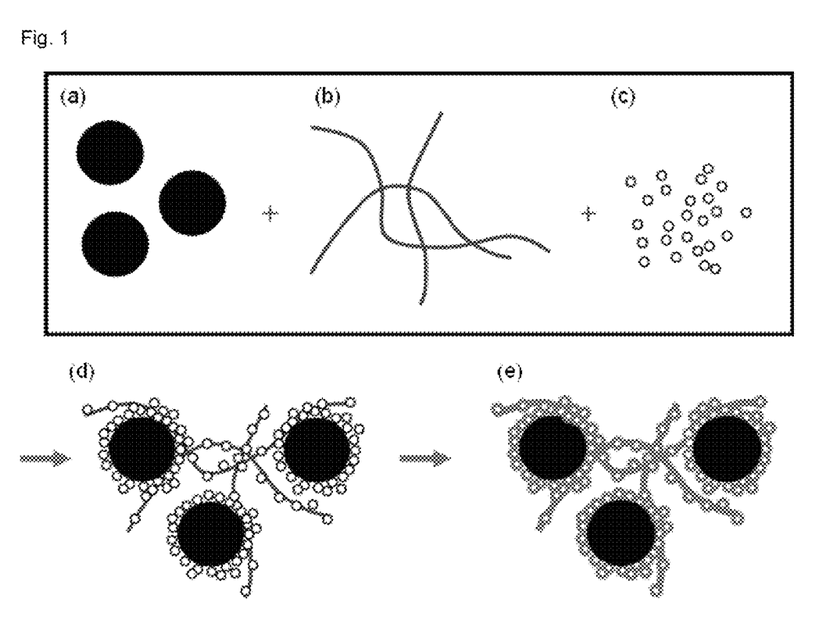
FIG. 1 is a schematic diagram showing the outline of the structure of negative electrode active material and a method for producing the same according to an exemplary embodiment of the present invention.

FIG. 1 is a schematic diagram for explaining a process for producing a carbon-containing composite in this exemplary embodiment.

An active material capable of intercalating and deintercalating lithium (capable of being charged and discharged) is shown in FIG. 1(a). Conductive nanofibers such as carbon nanotubes, carbon nanofibers, or silicon fibers are shown in FIG. 1(b). Conductive carbon particles such as carbon nanohorns are shown in FIG. 1(c).

First, the active material, the conductive nanofibers, and the conductive carbon particles shown in FIGS. 1(a) to (c) are uniformly mixed to form a carbon-containing mixture (FIG. 1(d)). Next, the obtained mixture is placed in a predetermined container, and the carbon-containing mixture is coated with a carbon material by using a chemical vapor phase deposition method and integrated to form a carbon-containing composite (FIG. 1(e)).

In the carbon-containing composite in this exemplary embodiment, the active material is buried in a conductive network structure made of the conductive nanofibers, and further the active material, the conductive nanofibers and the conductive carbon particles are integrated by performing carbon coating on the carbon-containing mixture having a structure in which the conductive carbon particles are in contact with the conductive nanofibers and the active material. By using the carbon-containing composite in this exemplary embodiment, the contact resistance between the conductive nanofibers, the conductive carbon particles and the active material is reduced, and accordingly resistance to current flow in the electrode is reduced in the conduction path of the conductive network. In addition, there is the effect of suppressing the breaking of the conduction path due to detachment caused by volume change during charge and discharge.

The active material is not particularly limited as long as it is a material that is capable of intercalating and deintercalating lithium. As active material, for example, carbon materials such as graphite, coke, soft carbon, and hard carbon, silicon, and silicon-containing compounds such as silicon oxides can be used. Among these, graphite is preferred in terms of high capacity and long life. In addition, in terms of high-speed charge and discharge and long life, soft carbon and hard carbon are preferred. In addition, for higher capacity exceeding that of carbon-based materials, silicon and silicon oxides are preferred.

The silicon oxide is not particularly limited and is represented, for example, by $SiO_x$ ($0<x<2$). The silicon oxide may include Li, and silicon oxide that includes Li is represented, for example, by $SiLi_yO_z$ ($y>0$, and $2>z>0$). In addition, silicon oxide may include a slight amount of a metal element(s) and/or a nonmetal element(s). The range of x is preferably $0.5 \leq x \leq 1.5$. When x is 0.5 or more, the amount of the silicon phase (or Si particles) is prevented from being excessive, and volume change is easily reduced. In addition, when x is 1.5 or less, the amount of the silicon phase (Si particles) increases, and the charge and discharge capacity is easily increased. The silicon oxide preferably has a configuration in which a silicon phase (Si particles) is present in a silicon oxide phase. A silicon phase causes an increase in charge and discharge capacity. When a silicon oxide phase is present around a silicon phase, volume change is reduced. The content of the Si particles in the silicon oxide is preferably 35 to 65%. The silicon oxide can contain, for example, 0.1 to 5% by mass of, for example, one or two or more elements selected from among nitrogen, boron and sulfur. When a slight amount of a metal element(s) and/or a nonmetal element(s) is present, the electrical conductivity of the silicon oxide can be improved. In addition, the silicon oxide may be crystalline or amorphous. The particle diameter (volume average) of the silicon oxide is, for example, 500 nm or more and 100 μm or less, preferably 1 μm or more and 40 μm or less.

Examples of the conductive nanofibers include fibrous materials such as carbon nanotubes, carbon nanofibers and silicon nanofibers. Among these, as the conductive nanofibers, conductive carbon fibers such as carbon nanotubes or carbon nanofibers are preferred, and carbon nanotubes are more preferred, in terms of conductivity. In addition, in terms of higher capacity, silicon nanofibers are preferred.

The diameter of the conductive nanofiber is preferably 1 nm or more and 500 nm or less, more preferably 5 nm or more and 300 nm or less, and further preferably 30 nm or more and 100 nm or less. In addition, the length of the conductive nanofiber is preferably 1 μm or more and 1000 μm or less, more preferably 2 μm or more and 500 μm or less, and further preferably 3 μm or more and 100 μm or less. When the diameter of the conductive nanofiber is 100 nm or less, the conductive nanofibers and the active material can be in contact with each other more effectively. When the length of the conductive nanofiber is 1 μm or more, the effect of the conductive path can be more effectively exerted. In addition, when the length of the conductive nanofiber is 1000 μm or less, the conductive nanofibers can be easily dispersed.

Examples of conductive carbon particles include carbon nanohorns, acetylene black, ketjen black, furnace black, micrographite and amorphous carbon. The average particle diameter (volume) of the conductive carbon particles is, for example, 1 nm or more and 200 nm or less.

The conductive carbon particles are preferably carbon nanohorns. The carbon nanohorns (hereinafter also referred to as CNHs) are aggregates in which the diameter of each nanohorn is approximately 2 to 5 nm, and the nanohorns aggregate and form a spherical shape with their tips outside. The diameter of the carbon nanohorns is, for example, 30 nm or more and 200 nm or less. In addition, by performing opening treatment on the CNHs, the internal space can be used, and the specific surface area is significantly improved. Therefore, by performing opening treatment on the CNHs, battery capacity can be increased. Examples of the method for opening fine pores in nanohorns include a method of oxidizing parts of nanohorns. In addition, the size of the openings (micropores) can be controlled by the oxidation conditions. For example, when oxidation due to heat treatment in an oxygen atmosphere occurs, the size of pores formed in nanohorns can be controlled by changing the treatment temperature. For example, when the temperature of the heat treatment is 350° C. or more and 550° C. or less, pores having a diameter of 0.3 nm or more and 1 nm or less can be formed in nanohorns. In addition, openings can also be formed by treatment with acid as shown in JP2003-95624A. For example, by treating carbon nanohorns at 110° C. for 15 minutes using a nitric acid solution, pores of about 1 nm can be formed. In addition, for example, by treating carbon nanohorns at 100° C. for 2 hours using hydrogen peroxide, pores of about 1 nm can be formed.

Examples of the method for mixing the active material, the conductive nanofibers, and the conductive carbon particles include, but are not particularly limited to, a concentration-solidification method and an impregnation method. When the concentration-solidification method or the impregnation method is used, an aqueous system, an organic solvent system, or the like can be used as the dispersion solvent, and hexane, methanol, ethanol, acetonitrile, benzene, toluene, or the like is preferably used.

The coating of the carbon-containing mixture with the carbon material can be carried out, for example, by a sputtering method, an arc vapor deposition method, and a chemical vapor deposition method. Among these, the chemical vapor deposition method is preferred, and in terms of easily controlling the vapor deposition temperature and the vapor deposition atmosphere, a chemical vapor phase deposition method (CVD method) is more preferred. In the CVD method, vapor deposition can be performed with the carbon-containing mixture placed in an alumina or quartz boat or the like, or vapor deposition can be performed with the carbon-containing mixture suspended or carried in a gas.

In carbon coating by a CVD reaction, carbon coating can be performed by pyrolyzing a carbon source to produce carbon, and attaching the produced carbon to the carbon-containing mixture. The implementation conditions and the implementation environment can be appropriately selected. The carbon source is not particularly limited, and, for example, hydrocarbon compounds such as methane, ethane, ethylene, acetylene, or benzene, organic solvents such as methanol, ethanol, toluene, or xylene, or carbon-containing gases such as CO can be used. In addition, as the atmosphere gas, for example, inert gases such as argon and nitrogen, or a mixture of inert gases and hydrogen can be used. The reaction temperature can be, for example, 400° C. or more and 1200° C. or less.

The flow rate of the carbon source and the atmosphere gas in the CVD reaction can be appropriately selected and is, for example, 1 mL/min or more and 10 L/min or less. The flow rate of the carbon source is preferably 10 mL/min or more and 500 mL/min or less, and when the flow rate of the carbon source is in this range, the carbon-containing mixture can be more uniformly coated. In addition, the flow rate of the atmosphere gas is preferably 100 mL/min or more and 1000 mL/min or less. The pressure in the CVD reaction can be appropriately selected and is, for example, 10 to 10000 Torr. The pressure is preferably 400 to 850 Torr.

The thickness of the carbon film is not particularly limited and is preferably 1 nm or more and 100 nm or less, more preferably 5 nm or more and 30 nm or less. By setting the thickness of the carbon film in the above region, sufficient conductivity can be provided. When the thickness of the carbon film is 1 nm or more, the conductivity can be more effectively improved. In addition, when the thickness of the carbon film is 100 nm or less, excessive increase volume is prevented and sufficient capacity can be obtained.

The content of the active material in the carbon-containing mixture is preferably 50 to 99% by mass, more preferably 85 to 99% by mass. In addition, the content of the conductive nanofibers in the carbon-containing mixture is preferably 0.1 to 10% by mass, more preferably 1 to 5% by mass. In addition, the content of the conductive carbon particles in the carbon-containing mixture is preferably 0.1 to 10% by mass, more preferably 0.1 to 5% by mass.

In this exemplary embodiment, it is preferred that carbon nanotubes be used as the conductive nanofibers, and carbon nanohorns be used as the conductive carbon particles. When carbon nanotubes and carbon nanohorns are used in combination, this results in a uniform mixture thereof, while the carbon nanohorns that feature good conductivity and high dispersibility prevent the aggregation of the carbon nanotubes, and thus, an effective conductive path can be formed.

In addition, it is preferred that the carbon nanohorns and the carbon nanotubes be immobilized by chemical bonds formed between carbon atoms included in the carbon nanohorns and carbon atoms included in the carbon nanotubes. More specifically, it is preferred that the carbon atoms of five-membered rings, seven-membered rings, and the like other than sp2 structures at the tips and side surfaces of the carbon nanohorns form bonds with the carbon atoms of the carbon nanotubes. These bonds can be formed, for example, by heating the carbon-containing mixture to high temperature (for example, 500 to 1300° C.) in an inert gas atmosphere or in a vacuum. This heat treatment can also be performed, for example, by using the heat treatment that is conducted in the CVD method.

In addition, it is preferred that the carbon nanohorns and the active material be immobilized by chemical bonds that are formed by carbon nanohorns and functional groups that are present on the surface of the active material. Functional groups are inherently present on the surfaces of many active materials, and functional groups can also be added to active material surfaces by acid-treating active materials. More specifically, it is preferred that the carbon atoms of five-membered rings, seven-membered rings, and the like other than sp2 structures at the tips and side surfaces of the carbon nanohorns form bonds with functional groups and defect portions on the active material surface. These bonds can be formed, for example, by heating the carbon-containing mixture to high temperature (for example, 300 to 1300° C.) in an inert gas atmosphere or in a vacuum. This heat treatment can also be performed, for example, by using the heat treatment that is conducted in the CVD method.

For example, a carbon-containing composite in which carbon nanohorns are attached to the surfaces of silicon oxide particles is subjected to heat treatment in a vacuum or in an inert gas atmosphere. By heat-treating the carbon-containing composite at high temperature at this time, five-membered rings and seven-membered rings in the tip portions of the carbon nanohorns are bonded to the surfaces of the silicon oxide particles. An advantage of the tip portions of the carbon nanohorns being bonded to the surfaces of the silicon oxide particles is that the resistance at the interfaces between the silicon oxide particles and the carbon nanohorns can be decreased, and the flow of electricity can be improved. The temperature of this heat treatment is, for example, in the range of 300 to 1800° C., preferably in the range of 500 to 1300° C. When the temperature of the heat treatment is in these ranges, the tip portions of the carbon nanohorns can be bonded to the surfaces of the silicon oxide particles.

In addition, it is preferred that chemical bonds be formed between the surface of the active material, the surface of the carbon nanotubes and the surface of the carbon nanohorns. The bonds between the carbon nanotubes and the active material can also be formed in the same manner as the bonds between the carbon nanohorns and the active material.

The carbon-containing composite obtained in this exemplary embodiment can be used as negative electrode active material, and can be effectively used particularly in the negative electrode of a lithium secondary battery.

Exemplary Embodiment 2

[1] Negative Electrode

The negative electrode can be made, for example, by forming a negative electrode active material layer including the negative electrode active material in the exemplary embodiment and a negative electrode binding agent on a negative electrode current collector.

The negative electrode can be made, for example, by forming a negative electrode active material layer including the negative electrode active material in the exemplary embodiment and a negative electrode binding agent on a negative electrode current collector. Examples of the method for forming the negative electrode active material layer include a doctor blade method, a die coater method, a CVD method, and a sputtering method. It is possible to first form the negative electrode active material layer and then form a thin film of aluminum, nickel, or an alloy thereof by a method such as vapor deposition or sputtering to provide a negative electrode current collector.

In addition, the negative electrode active material layer may include an active material other than the negative electrode active material in the exemplary embodiment. Examples of other active materials include graphite, acetylene black, ketjen black, carbon fibers, carbon nanotubes, carbon nanohorns and graphene sheets. By mixing the negative electrode active material in the exemplary embodiment and these active materials, an increase in capacity, a reduction in internal resistance, and the like can be obtained.

In addition, the negative electrode active material layer may include a conductive auxiliary agent such as carbon from the view point of improving conductivity.

The binding agent for the negative electrode is not particularly limited, and, for example, polyvinylidene fluoride, vinylidene fluoride-hexafluoropropylene copolymers, vinylidene fluoride-tetrafluoroethylene copolymers, styrene-butadiene copolymerized rubbers, polytetrafluoroethylene, polypropylene, polyethylene, polyimides and polyamideimides can be used. Among these, polyimides or polyamideimides are preferred because of strong binding properties. The amount of the binding agent for the negative electrode is preferably 7 to 20 parts by mass based on 100 parts by mass of the negative electrode active material from the view point of obtaining "sufficient binding force" and "higher energy" in a trade-off relationship.

As the negative electrode current collector, nickel, copper, silver, aluminum, and alloys thereof are preferred because of electrochemical stability of these elements. Examples of its shape include foil, a flat plate shape, and a mesh shape. In particular, copper foil is preferred.

[2] Positive Electrode

The positive electrode is obtained, for example, by binding positive electrode active material to a positive electrode current collector with a binding agent for a positive electrode.

As the positive electrode active material, known lithium-containing transition metal oxides can be used. Specific examples include $LiCoO_2$, $LiNiO_2$, $LiMn_2O_4$, $LiFePO_4$, $LiFeSiO_4$, $LiFeBO_3$, $Li_3V_2(PO_4)_3$, and $Li_2FeP_2O_7$. Further examples include lithium manganate having a layered structure or lithium manganate having a spinel structure such as $LiMnO_2$ or $Li_xMn_2O_4$ (0<x<2); $LiCoO_2$, $LiNiO_2$, or lithium transition metal oxides in which parts of the transition metals are replaced by other metals; lithium transition metal oxides in which particular transition metals do not exceed half, such as $LiNi_{1/3}Co_{1/3}Mn_{1/3}O_2$; and these lithium transition metal oxides in which the amount of Li is greater than in stoichiometric compositions. In particular, $Li_\alpha Ni_\beta Co_\gamma Al_\delta O_2$ ($1 \leq \alpha \leq 1.2$, $\beta+\gamma+\delta=1$, $\beta \geq 0.7$, and $\gamma \leq 0.2$) or $Li_\alpha Ni_\beta Co_\gamma Mn_\delta O_2$ ($1 \leq \alpha \leq 1.2$, $\beta+\gamma+\delta=1$, $\beta \geq 0.6$, and $\gamma \leq 0.2$) is preferred. One positive electrode active material can be used alone, or two or more positive electrode active materials can be used in combination.

The same biding agents that are used for negative electrodes can be used as biding agents for positive electrodes. Among them, polyvinylidene fluoride is preferred in terms of versatility and low cost. The amount of the binding agent for the positive electrode is preferably 2 to 10 parts by mass based on 100 parts by mass of the positive electrode active material from the view point of obtaining "sufficient binding force" and "higher energy" in a trade-off relationship.

The same current collector that are used for the negative electrode current collector can be used for the positive electrode current collector.

A conductive auxiliary material may be added to a positive electrode active material layer including the positive electrode active material for the purpose of decreasing impedance. Examples of the conductive auxiliary material include carbonaceous fine particles such as graphite, carbon black, and acetylene black.

[3] Electrolyte

The electrolyte used in this exemplary embodiment is not particularly limited, and, for example, known electrolytes can be used. Examples of electrolyte include liquid electrolytic solutions and gel-like polymer electrolytes.

For example, an electrolytic solution can include a nonaqueous electrolytic solvent and a supporting salt.

The supporting salt is not particularly limited. Examples thereof include lithium salts such as $LiPF_6$, $LiClO_4$, $LiBF_4$, $LiAlO_4$, $LiAlCl_4$, $LiSbF_6$, $LiSCN$, $LiCl$, and $LiCF_3SO_3$. One supporting salt can be used alone, or two or more supporting salts can be mixed and used in combination.

The kind of nonaqueous electrolytic solvent is not particularly limited. Examples thereof include aprotic organic solvents such as cyclic carbonates such as propylene carbonate (PC), ethylene carbonate (EC), butylene carbonate (BC), and vinylene carbonate (VC); chain carbonates such as dimethyl carbonate (DMC), diethyl carbonate (DEC), ethyl methyl carbonate (EMC), and dipropyl carbonate (DPC); propylene carbonate derivatives; and aliphatic carboxylates such as methyl formate, methyl acetate, and ethyl propionate. For the nonaqueous electrolytic solvent, cyclic or chain carbonates such as ethylene carbonate (EC), propylene carbonate (PC), butylene carbonate (BC), vinylene carbonate (VC), dimethyl carbonate (DMC), diethyl carbonate (DEC), ethyl methyl carbonate (MEC), and dipropyl carbonate (DPC) are preferred. These substances include partially or fully halogenated substances. One nonaqueous electrolytic solvent can be used alone, or two or more nonaqueous electrolytic solvents can be used in combination.

In addition, as the nonaqueous electrolytic solvent, carbonate compounds are preferably used. By using carbonate compounds, the ion dissociation properties of the electrolytic solution are improved, and the viscosity of the electrolytic solution decreases. Therefore, ion mobility can be improved. But, the carbonate compounds easily generate gases by decomposition and tend to cause swelling. Therefore, by providing the configuration of this exemplary embodiment, swelling in the thickness direction can be reduced, and deformation of a battery device can thus be prevented. Examples of the carbonate compounds include cyclic carbonates and chain carbonates as described above. Examples of the carbonate compounds include ethylene carbonate (EC), propylene carbonate (PC), butylene carbonate (BC), vinylene carbonate (VC), dimethyl carbonate (DMC), diethyl carbonate (DEC), ethyl methyl carbonate (MEC) and dipropyl carbonate (DPC) as described above. The electrolytic solution preferably includes the carbonate compound as a main solvent. The content of the carbonate compound in the solvent is preferably 60% by volume or more, more preferably 70% by volume or more, further preferably 80% by volume or more, and particularly preferably 90% by volume or more.

[4] Separator

As the separator, for example, porous films and nonwoven fabrics of polypropylene, polyethylene, and the like can be used. In addition, laminated films in which they are laminated can also be used as separators.

[5] Package

A package can be appropriately selected as long as it has resistance to the electrolytic solution and has sufficient water vapor barrier properties. For example, in the case of a laminate type secondary battery, as the package, laminate films that are made of aluminum, silica-coated polypropylene, polyethylene and the like can be used. In particular, from the view point of reducing volume expansion, aluminum laminate films are preferably used.

[6] Secondary Battery

The configuration of a secondary battery according to this exemplary embodiment is not particularly limited and can be, for example, a configuration in which an electrode element including a positive electrode and a negative electrode that are disposed opposed to each other and an electrolytic solution are included in a package. The shape of the secondary battery is not particularly limited. Examples thereof include a cylindrical type, a flat wound prismatic type, a laminated prismatic type, a coin type, a flat wound laminate type, or a laminate type.

Figure 4:
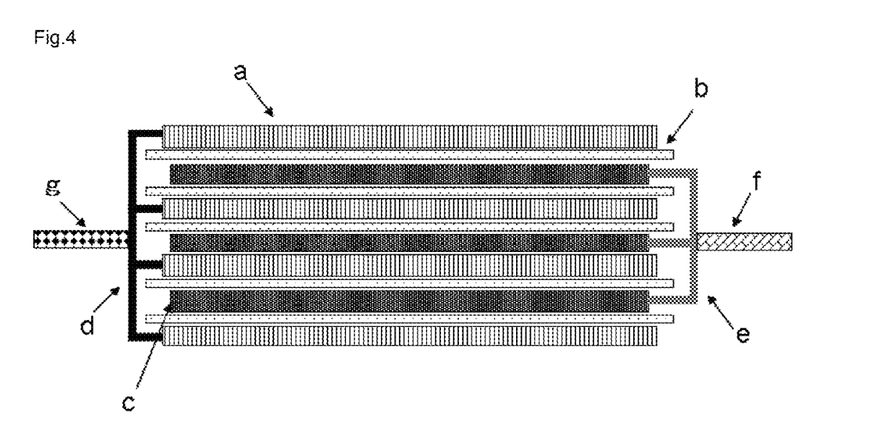
FIG. 4 is a schematic cross-sectional view showing an example of the configuration of a lithium secondary battery according to an exemplary embodiment of the present invention.

A laminate type secondary battery will be described below as an example. FIG. 4 is a schematic cross-sectional view showing the structure of the electrode element of a laminate type secondary battery. This electrode device is formed in such a manner that a plurality of positive electrodes c and a plurality of negative electrodes a are alternately stacked with separators b sandwiched therebetween. The positive electrode current collectors e of the positive electrodes c are welded and electrically connected to each other at the ends not covered with the positive electrode active material, and further, a positive electrode terminal f is welded to the welded part. The negative electrode current collectors d of the negative electrodes a are welded and electrically connected to each other at the ends not covered with the negative electrode active material, and further, a negative electrode terminal g is welded to the welded part.

EXAMPLES

Examples will be shown below, and the present invention will be illustrated and described in more detail. Of course, the invention is not limited by the following examples.

Example 1

Figure 2:
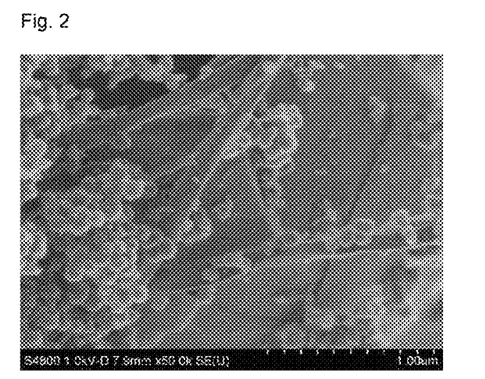
FIG. 2 is an SEM photograph of a carbon-containing mixture in an Example.

10 g of graphite, 200 mg of carbon nanotubes, and 200 mg of carbon nanohorns were immersed in ethanol and ultrasonically dispersed. The ultrasonic dispersion was performed for 5 minutes. The obtained dispersion was filtered and dried at 100° C. for 5 hours to obtain a carbon-containing mixture. The carbon-containing mixture made was placed in a boat made of alumina and heated to 1000° C. in an argon gas flow (Ar flow rate; 500 ml/min), and then, the temperature was decreased to 800° C. in the argon gas flow for stabilization. Next, ethylene gas (100 mL/min) was introduced into argon gas (500 mL/min) to vapor-deposit carbon on the carbon-containing mixture for 20 minutes. Then, the ethylene gas was stopped, and the temperature was decreased to around room temperature in the argon gas to obtain a carbon-containing composite. FIG. 2 is an SEM image of the carbon-containing mixture. The substance that looks like a plate of 1 µm or more indicates graphite, and the spherical substance of about 100 nm indicates carbon nanohorns. In addition, the fibrous substance having a diameter of about 200 nm indicates carbon nanotubes. Compared with the carbon-containing composite (see FIG. 3) obtained by the process after obtaining the carbon-containing mixture, a clean surface structure is observed.

Figure 3:
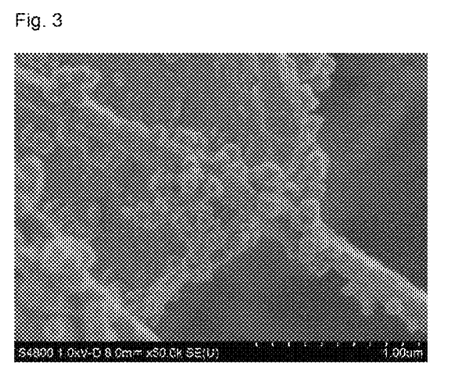
FIG. 3 is an SEM photograph of a carbon-containing composite in an Example.

FIG. 3 is an SEM photograph of the obtained carbon-containing composite. The substance that looks like a plate of 1 µm or more indicates graphite, and the spherical substance of about 100 nm indicates carbon nanohorns. In addition, the fibrous substance that has a diameter of about 200 nm indicates carbon nanotubes. In this Example, the carbon-containing mixture is heat-treated, and then, its surface is coated with the carbon material, and therefore, compared with the carbon-containing mixture in FIG. 2, small unevenness is observed on the surface.

Further, 80% by mass of the obtained carbon-containing composite and 20% by mass of polyvinylidene fluoride (PVDF) were mixed, N methyl-2-pyrrolidinone was further mixed, and the mixture was sufficiently stirred to prepare a negative electrode slurry. The negative electrode slurry was applied on copper foil having a thickness of 10 µm to form a film that had a thickness of 100 µm. Then, the coated copper foil was dried at 120° C. for 1 hour, and then, an electrode was pressure-formed by a roller press. Further, this electrode was punched into 2 cm$^2$ to make a negative electrode. The sheet resistance of the obtained negative electrode was measured and, as a result, was 80Ω/□.

<Battery Characteristics>

A lithium ion secondary battery (test cell) was made using the above negative electrode, Li foil as a positive electrode, an electrolytic solution, and a separator. The electrolytic solution was prepared by dissolving $LiPF_6$ in a mixed solvent of ethylene carbonate and methyl ethyl carbonate (volume ratio 3:7) at a concentration of 1 M. As the separator, a 30 µm porous film made of polyethylene was used.

For the secondary battery made, charge and discharge characteristics were examined as follows. First, the secondary battery was set in a charge and discharge tester, charged at a constant current of 0.5 mA/cm$^2$ until the voltage reached 0.02 V, and charged in the state of 0.02 V with the current decreased. Then, the charge was completed at a point when the current value reached 60 µA/cm$^2$. The discharge was performed at a constant current of 0.5 mA/cm$^2$, and completed at a point when the cell voltage reached 2.0 V, and the discharge capacity was obtained. This operation was repeated 50 times, and the cycle characteristics was examined. As a result, the retention rate of discharge capacity after the cycle test (the retention rate of discharge capacity after 50 cycles to discharge capacity after 1 cycle) was 94%.

Comparative Example 1

A negative electrode and a secondary battery (test cell) were made as in Example 1 except that the above carbon-containing mixture was used as the negative electrode active material instead of the carbon-containing composite, and the sheet resistance and the charge and discharge characteristics were examined. The sheet resistance of the obtained negative electrode was measured as in Example 1 and was 300Ω/□, which was higher than the sheet resistance of the negative electrode using the carbon-containing composite. In addition, the retention rate of the discharge capacity was 90%, which was lower than the retention rate of the secondary battery using the negative electrode including the carbon-containing composite.

Figure 5:
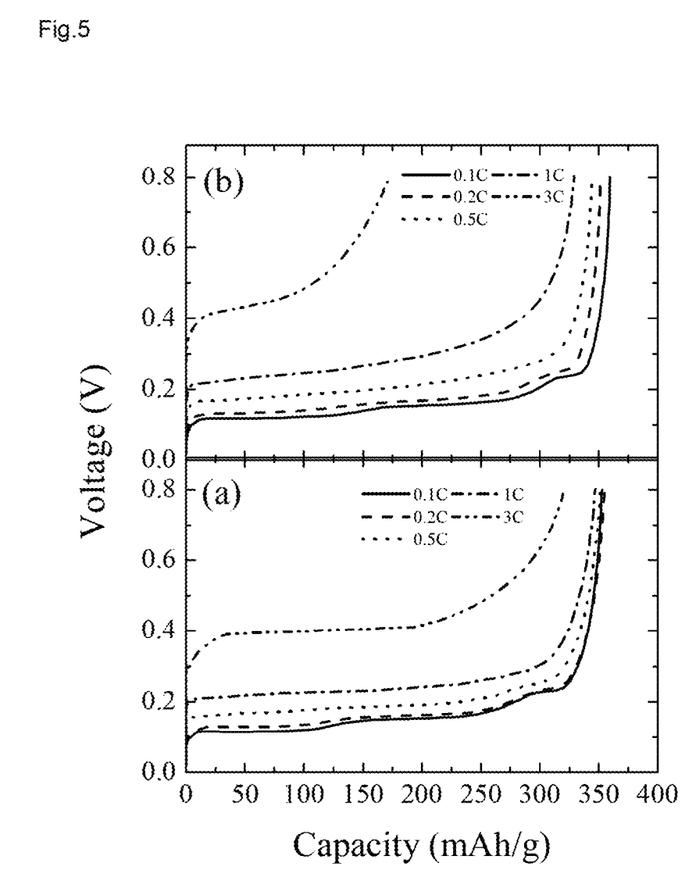
FIG. 5 is a diagram showing the results of the rate characteristics of batteries in Example 1 and Comparative Example 1.

In addition, the results of evaluating the discharge rate characteristics of the secondary batteries obtained in Example 1 and Comparative Example 1 at 0.1 C, 0.2 C, 0.5 C, 1 C, and 3 C are shown in FIG. 5. As shown in FIG. 5, a decrease in capacity due to an increase in rate was larger in the secondary battery obtained in Comparative Example 1 (FIG. 5 (b)) than in the secondary battery obtained in Example 1 (FIG. 5 (a)). In addition, as seen from FIG. 5, it was seen that the capacity of the secondary battery according to this exemplary embodiment was enhanced when compared with Comparative Example 1 at the same rate.

Example 2

A negative electrode was made as in Example 1 except that acetylene black was used instead of carbon nanohorns, and the sheet resistance was measured. The result is shown in Table 1.

Example 3

A negative electrode was made as in Example 1 except that silicon was used instead of graphite, and acetylene black was used instead of carbon nanohorns, and the sheet resistance was measured. The result is shown in Table 1.

Example 4

A negative electrode was made as in Example 1 except that a silicon oxide was used instead of graphite, and acetylene black was used instead of carbon nanohorns, and the sheet resistance was measured. The result is shown in Table 1.

Comparative Example 2

A carbon-containing mixture was made as in Example 1 except that acetylene black was used instead of carbon nanohorns. A negative electrode was made as in Example 1 except that the carbon-containing mixture was used as the negative electrode active material instead of the carbon-containing composite, and the sheet resistance was measured. The result is shown in Table 1.

Comparative Example 3

A carbon-containing mixture was made as in Example 1 except that silicon was used instead of graphite, and acetylene black was used instead of carbon nanohorns. A negative electrode was made as in Example 1 except that the carbon-containing mixture was used as the negative electrode active material instead of the carbon-containing composite, and the sheet resistance was measured. The result is shown in Table 1.

Comparative Example 4

A carbon-containing mixture was made as in Example 1 except that a silicon oxide was used instead of graphite, and acetylene black was used instead of carbon nanohorns. A negative electrode was made as in Example 1 except that the carbon-containing mixture was used as the negative electrode active material instead of the carbon-containing composite, and sheet resistance was measured. The result is shown in Table 1.

TABLE 1

| | Active material | Conductive nanofibers | Conductive carbon particles | Carbon coating | Sheet resistance ($\Omega/\square$) |
|---|---|---|---|---|---|
| Example 2 | Graphite | Carbon nanotubes | Acetylene black | With carbon coating | 300 |
| Example 3 | Silicon | Carbon nanotubes | Acetylene black | With carbon coating | 400 |
| Example 4 | Silicon oxide | Carbon nanotubes | Acetylene black | With carbon coating | 400 |
| Comparative Example 2 | Graphite | Carbon nanotubes | Acetylene black | Without carbon coating | 500 |
| Comparative Example 3 | Silicon | Carbon nanotubes | Acetylene black | Without carbon coating | 700 |
| Comparative Example 4 | Silicon oxide | Carbon nanotubes | Acetylene black | Without carbon coating | 700 |

From the above results, it was seen that by carbon-coating the carbon-containing mixture to integrate it, the electrode resistance decreased, and the rate characteristics and the cycle characteristics were improved.

According to the exemplary embodiment, a lithium secondary battery having excellent load characteristics at high current and an excellent capacity retention rate can be provided.

This application claims the right of priority to Japanese Patent Application No. 2012-128926 filed on Jun. 6, 2012, the entire content of which is incorporated herein by reference.

While the present invention has been described with reference to the exemplary embodiments and the Examples, the present invention is not limited to the above exemplary embodiments and the Examples. Various changes that can be understood by those skilled in the art may be made to the constitution and details of the present invention within the scope thereof.

Further Exemplary Embodiment 1

A negative electrode active material comprising a carbon-containing composite,
wherein, in the carbon-containing composite, an active material capable of intercalating and deintercalating lithium, conductive nanofibers and conductive carbon particles are coated with a carbon material and are integrated.

Further Exemplary Embodiment 2

The negative electrode active material according to further exemplary embodiment 1, wherein the conductive nanofibers are carbon nanotubes.

Further Exemplary Embodiment 3

The negative electrode active material according to further exemplary embodiment 1 or 2, wherein the conductive carbon particles are carbon nanohorns.

Further Exemplary Embodiment 4

The negative electrode active material according to further exemplary embodiment 1, wherein the conductive nanofibers are carbon nanotubes, and the conductive carbon particles are carbon nanohorns.

Further Exemplary Embodiment 5

The negative electrode active material according to further exemplary embodiment 4, wherein micropores are formed in the carbon nanohorns.

Further Exemplary Embodiment 6

The negative electrode active material according to further exemplary embodiment 4 or 5, wherein the carbon nanohorns and the carbon nanotubes are immobilized by chemical bonds formed between carbon atoms included in the carbon nanohorns and carbon atoms included in the carbon nanotubes.

Further Exemplary Embodiment 7

The negative electrode active material according to any one of further exemplary embodiments 4 to 6, wherein the active material, the carbon nanotubes and the carbon nanohorns are immobilized by chemical bonds formed between surfaces of the active material, the carbon nanotubes and the carbon nanohorns.

Further Exemplary Embodiment 8

The negative electrode active material according to any one of further exemplary embodiments 1 to 7, wherein the active material, the conductive nanofibers and the conductive carbon particles are integrated by being coated with the carbon material in a state in which the carbon nanohorns are in contact with each of the active material and the conductive nanofibers.

Further Exemplary Embodiment 9

The negative electrode active material according to any one of further exemplary embodiments 1 to 8, wherein the carbon-containing composite has a configuration in which a carbon-containing mixture comprising the active material, the conductive nanofibers and the conductive carbon particles is coated with the carbon material.

Further Exemplary Embodiment 10

The negative electrode active material according to any one of further exemplary embodiments 1 to 9, wherein the active material is buried in a conductive network structure comprising the conductive nanofibers.

Further Exemplary Embodiment 11

The negative electrode active material according to any one of further exemplary embodiments 1 to 10, wherein the active material is graphite, silicon or a silicon oxide.

Further Exemplary Embodiment 12

A negative electrode for a lithium secondary battery comprising the negative electrode active material according to any one of further exemplary embodiments 1 to 11.

Further Exemplary Embodiment 13

A lithium secondary battery comprising the negative electrode for a lithium secondary battery according to further exemplary embodiment 12.

Further Exemplary Embodiment 14

A method for producing a negative electrode active material, comprising:
(1) mixing active material capable of intercalating and deintercalating lithium, conductive nanofibers, and conductive carbon particles to obtain a carbon-containing mixture; and
(2) coating the carbon-containing mixture with a carbon material to integrate the active material, the conductive nanofibers and the conductive carbon particles.

Further Exemplary Embodiment 15

The method for producing a negative electrode active material according to further exemplary embodiment 14, wherein in the step (2), the carbon-containing mixture is coated with the carbon material using a CVD method.

Further Exemplary Embodiment 16

The method for producing a negative electrode active material according to further exemplary embodiment 15, wherein in the CVD method, temperature is 500 to 1200° C., and methane, ethane, ethylene, acetylene, benzene, methanol or ethanol is used as a carbon source of the carbon material.

Further Exemplary Embodiment 17

The method for producing a negative electrode active material according to any one of further exemplary embodiments 14 to 16, wherein the conductive nanofibers are carbon nanotubes.

Further Exemplary Embodiment 18

The method for producing a negative electrode active material according to any one of further exemplary embodiments 14 to 17, wherein the conductive carbon particles are carbon nanohorns.

Further Exemplary Embodiment 19

The method for producing a negative electrode active material according to any one of further exemplary embodiments 14 to 16, wherein the conductive nanofibers are carbon nanotubes, and the conductive carbon particles are carbon nanohorns.

Further Exemplary Embodiment 20

The method for producing a negative electrode active material according to further exemplary embodiment 19, further comprising a step of performing heat treatment between the step (1) and the step (2).

Further Exemplary Embodiment 21

The method for producing a negative electrode active material according to further exemplary embodiment 20, wherein bonds are formed at least between the carbon nanohorns and the carbon nanotubes by the heat treatment.

The invention claimed is:
1. A negative electrode active material comprising a carbon-containing composite, wherein the carbon-containing composite comprises:
  an active material capable of intercalating and deintercalating lithium,
  conductive nanofibers,
  conductive carbon particles, and
  a carbon material;
the conductive carbon particles are in contact with the active material and the conductive nanofibers;
the active material, the conductive nanofibers, and the conductive carbon particles are integrated by coating a carbon-containing mixture comprising the active material, the conductive nanofibers, and the conductive carbon particles with the carbon material;
the active material, the conductive nanofibers, and the conductive carbon particles are coated with the carbon material by the coating to form a carbon film;
an average particle diameter of the active material is greater than or equal to 1 micrometer;
an average particle diameter of the conductive carbon particles is greater than or equal to 1 nanometer and is less than or equal to 200 nanometers;
a length of the conductive nanofibers is greater than or equal to 1 micrometer and less than or equal to 1000 micrometers;
a diameter of the conductive nanofibers is greater than or equal to 1 nanometer and less than or equal to 500 nanometers;
a thickness of the carbon film is greater than or equal to 1 nanometer and less than or equal to 100 nanometers;
a content of the active material in the carbon-containing mixture is between 85 percent and 99 percent by mass;
a content of the conductive nanofibers in the carbon-containing mixture is between 0.1 percent and 10 percent by mass;
a content of the conductive carbon particles in the carbon-containing mixture is between 0.1 percent and 10 percent by mass; and
the conductive carbon particles are carbon nanohorns.

2. The negative electrode active material according to claim 1, wherein the conductive nanofibers are carbon nanotubes.

3. The negative electrode active material according to claim 1, wherein the conductive nanofibers are carbon nanotubes, and the conductive carbon particles are carbon nanohorns.

4. The negative electrode active material according to claim 3, wherein the carbon nanohorns and the carbon nanotubes are immobilized by chemical bonds formed between carbon atoms included in the carbon nanohorns and carbon atoms included in the carbon nanotubes.

5. The negative electrode active material according to claim 1, wherein the active material is buried in a conductive network structure comprising the conductive nanofibers.

6. A negative electrode for a lithium secondary battery comprising the negative electrode active material according to claim 1.

7. A lithium secondary battery comprising the negative electrode for a lithium secondary battery according to claim 6.

8. A method for producing a negative electrode active material, comprising:
(1) mixing active material capable of intercalating and deintercalating lithium, conductive nanofibers and conductive carbon particles to obtain a carbon-containing mixture; and
(2) coating the carbon-containing mixture with a carbon material to integrate the active material, the conductive nanofibers and the conductive carbon particles;
wherein the conductive carbon particles are in contact with the active material and the conductive nanofibers;
the active material, the conductive nanofibers, and the conductive carbon particles are coated with the carbon material by the coating to form a carbon film;
an average particle diameter of the active material is greater than or equal to 1 micrometer;
an average particle diameter of the conductive carbon particles is greater than or equal to 1 nanometer and is less than or equal to 200 nanometers;
a length of the conductive nanofibers is greater than or equal to 1 micrometer and less than or equal to 1000 micrometers;
a diameter of the conductive nanofibers is greater than or equal to 1 nanometer and less than or equal to 500 nanometers;
a thickness of the carbon film is greater than or equal to 1 nanometer and less than or equal to 100 nanometers;
a content of the active material in the carbon-containing mixture is between 85 percent and 99 percent by mass;
a content of the conductive nanofibers in the carbon-containing mixture is between 0.1 percent and 10 percent by mass;
a content of the conductive carbon particles in the carbon-containing mixture is between 0.1 percent and 10 percent by mass; and
the conductive carbon particles are carbon nanohorns.

9. The negative electrode active material according to claim 1, wherein the active material comprises graphite, silicon, or silicon oxide.

10. The negative electrode active material according to claim 1, wherein the active material comprises silicon oxide.

11. The method according to claim 9, wherein the active material comprises graphite, silicon, or silicon oxide.

12. The method according to claim 9, wherein the active material comprises silicon oxide.

* * * * *